United States Patent [19]
Cleaveland

[11] 3,958,093
[45] May 18, 1976

[54] METALCLAD SWITCHGEAR USING VACUUM INTERRUPTER ELEMENTS WITH IMPROVED RESILIENT SUPPORTING MEANS

[75] Inventor: Charles M. Cleaveland, Irwin, Pa.

[73] Assignee: Westinghouse Electric Corporation, Pittsburgh, Pa.

[22] Filed: May 3, 1974

[21] Appl. No.: 466,746

[52] U.S. Cl. .................. 200/144 B; 200/50 AA
[51] Int. Cl.² ...................................... H01H 33/66
[58] Field of Search ....... 200/50 AA, 144 R, 144 B, 200/262, 270, 289, 306, 238, 48 R; 174/5 R, 16 R; 317/103, 114, 100

[56] References Cited
UNITED STATES PATENTS

| | | | |
|---|---|---|---|
| 2,824,939 | 2/1958 | Claybourn et al. | 200/289 |
| 3,004,116 | 10/1961 | Griscom | 200/48 R |
| 3,280,282 | 10/1966 | Rodeseike et al. | 200/50 AA X |
| 3,299,240 | 1/1967 | Foti | 200/270 X |
| 3,579,045 | 5/1971 | Keogh et al. | 200/50 AA X |
| 3,603,753 | 9/1971 | Frink | 200/144 B |
| 3,621,170 | 11/1971 | Jensen | 200/50 AA X |
| 3,657,495 | 4/1972 | Charamel et al. | 200/48 R X |
| 3,710,044 | 1/1973 | Sharp | 200/50 AA |
| 3,783,208 | 1/1974 | Davies et al. | 200/50 AA |
| 3,793,494 | 2/1974 | Cleaveland | 200/50 AA |
| 3,829,647 | 8/1974 | Cleaveland | 174/16 R X |

Primary Examiner—James R. Scott
Attorney, Agent, or Firm—W. R. Crout

[57] ABSTRACT

An improved circuit-breaker is provided utilizing generally flat, horizontal, vertically-spaced power-conductors, which cooperate with the ends of pairs of post-type insulators to result in facilitated cooling and a desirable increase in the current-carrying capacity of the circuit-breaker. Higher continuous currents are achieved by the use of vertically-spaced, horizontal conductor-assemblies, which expose large surface areas to the air, in conjunction with high-strength post-insulators of novel construction. Additionally, the flat, rectangularly shaped, power conductors offer a useful available mounting surface for a vacuum-interrupter unit, when the latter is used as the interrupting means.

9 Claims, 12 Drawing Figures

METALCLAD SWITCHGEAR USING VACUUM INTERRUPTER ELEMENTS WITH IMPROVED RESILIENT SUPPORTING MEANS

CROSS-REFERENCES TO RELATED APPLICATIONS

Reference may be made to U.S. Pat. application, filed Aug. 19, 1974, Ser. No. 498,499, by Charles M. Cleveland entitled "Improved Air-Type Circuit-Interrupters Using Rectangular Bars for Conductor-Assemblies," and assigned to the assignee of the instant application.

Also, reference may be made to a second U.S. Pat. application filed Nov. 8, 1974, Ser. No. 522,192, by Richard J. Burgoon and likewise assigned to the assignee of the instant application.

BACKGROUND OF THE INVENTION

The present invention has particular applicability to vacuum-type circuit-interrupters which are utilized in metal-clad switchgear constructions, such as set forth in the following U.S. Pat. Nos.: 3,590,188-Frink et al; 3,531,608-Bateman; 3,435,162-Kozlovic, and 3,603,753-Frink.

It is desirable to provide the higher-amperage circuit-interrupters, say, for example, 3,000 amperes, with improved cost-reduction features, without jeopardizing reliability and capability, and to utilize in connection therewith low-cost component parts.

The present invention has particular applicability to roll-in-type switchgear units, which roll into cell structures, such as set forth in FIGS. 35 and 37 in U.S. Pat. No. 3,590,188, and FIGS. 4–6 of the aforesaid U.S. Pat. No. 3,603,753-Frink, and it is, consequently, desirable to provide a proper and accurate alignment means between the movable primary disconnecting contacts, associated with the roll-in-type switchgear unit, and the relatively stationary primary disconnecting contacts, the latter being associated and mounted interiorly within the cooperating metal-clad cell structure.

In the past, mechanical support and alignment of primary conductors were achieved by babbiting or casting the conductors into a large porcelain structure, such as shown in U.S. Pat. No. 3,437,554, issued Apr. 8, 1969 to James Gamble. This resulted in shielding of the power conductor from the air and thereby limiting the current rating to 2,000 amperes in one particular rating circuit-breaker.

SUMMARY OF THE INVENTION

In accordance with the present invention, there is provided an improved low-cost circuit-breaker of improved construction incorporating generally horizontal, flat, spaced conductors that offer, in addition, a flat mounting surface for supporting insulator-pairs of the post-type. The same flat horizontally spaced power conductors offer, in addition, a flat mounting surface for the vacuum-interrupter unit, when used. The supporting insulator pairs, disposed front-to-back, side-to-side, or diagonally, as desired provide stability and parallelness of the flat conductors, and maintain the spacing between the upper and lower primary conductor pairs so that the finger-cluster contacts disposed on the rear of the power conductors of the circuit-breaker will be properly aligned for connecting to the mating cell power conductors. The spacing provided between the flat power conductor pairs provides an open ventilated construction so that maximum convection cooling can be obtained. In past-art structures, the breaker conductors have been surrounded by supporting babbit, porcelain, or epoxy, such as exemplified in the aforesaid U.S. Pat. No. 3,437,554, and thereby prohibiting cooling by contact with the air and restricting the continuous current rating of the breaker.

Additional advantages with the separated conductor pairs are obtained, since space is thereby provided for the mounting hardware of the supporting insulator-pairs and vacuum-interrupter. Also provided is space for cooling fins which may optionally completely surround each flat power conductor, as related in U.S. Pat. No. 3,621,108.

This construction, as described, results in a less-expensive circuit-breaker since the flat bars cost less than the conventional round bars, and the post-insulator pairs are less expensive than the conventional one-piece somewhat massive porcelain support, or one-piece epoxy support; and the amount of conducting material for a given current rating is less, since the cooling efficiency has been increased, and a further cost improvement is obtained by using the already available current-carrying power members as mounting surfaces for the supporting insulators and the vacuum-interrupter unit, when used.

DESCRIPTION OF THE PREFERRED EMBODIMENTS

Figure 1:
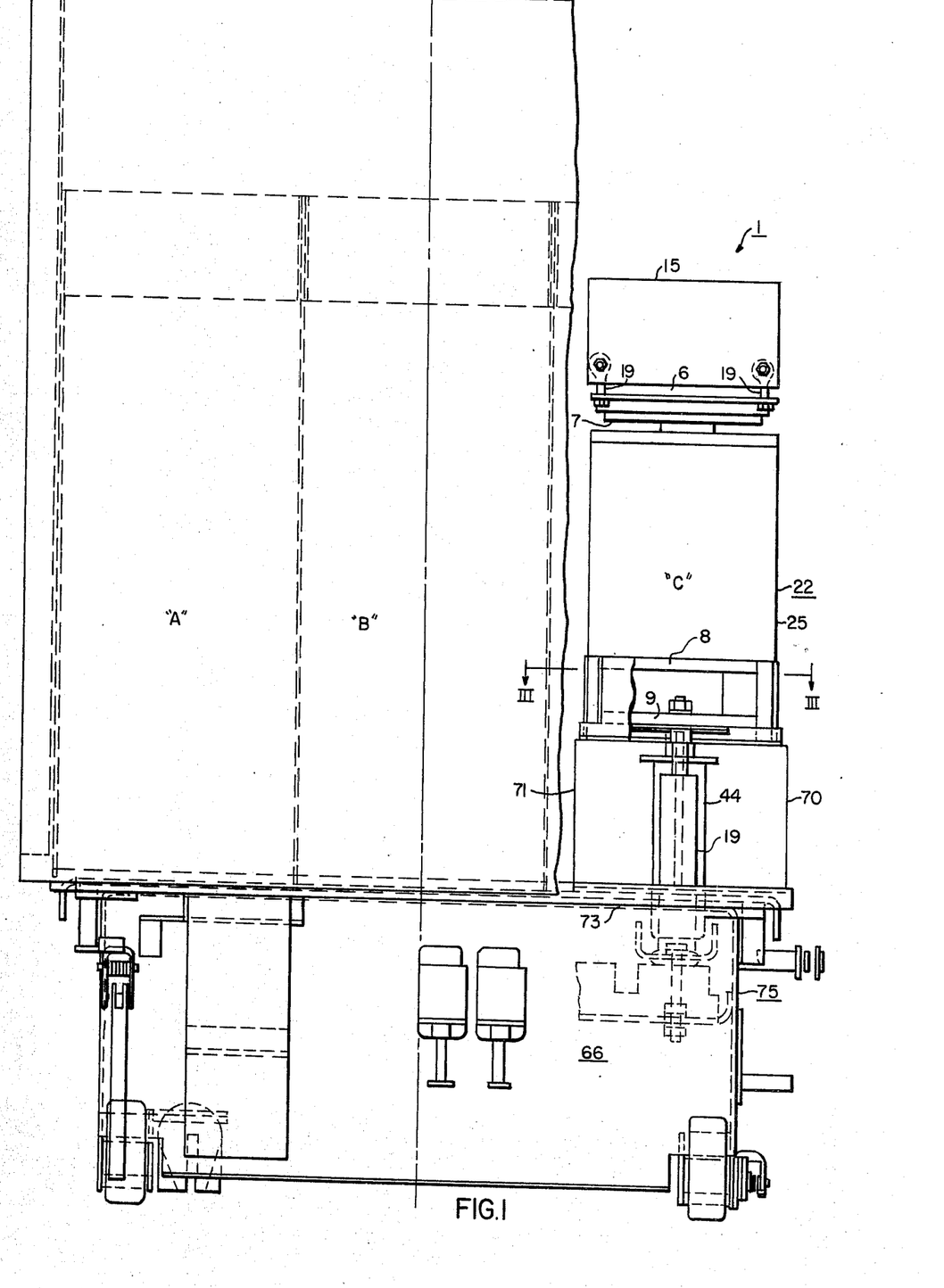
FIG. 1 is a front elevational view, partially in section, of a three-phase circuit-breaker incorporating the principles of the present invention, the contact structure being illustrated in the closed-circuit position.
Figure 2:
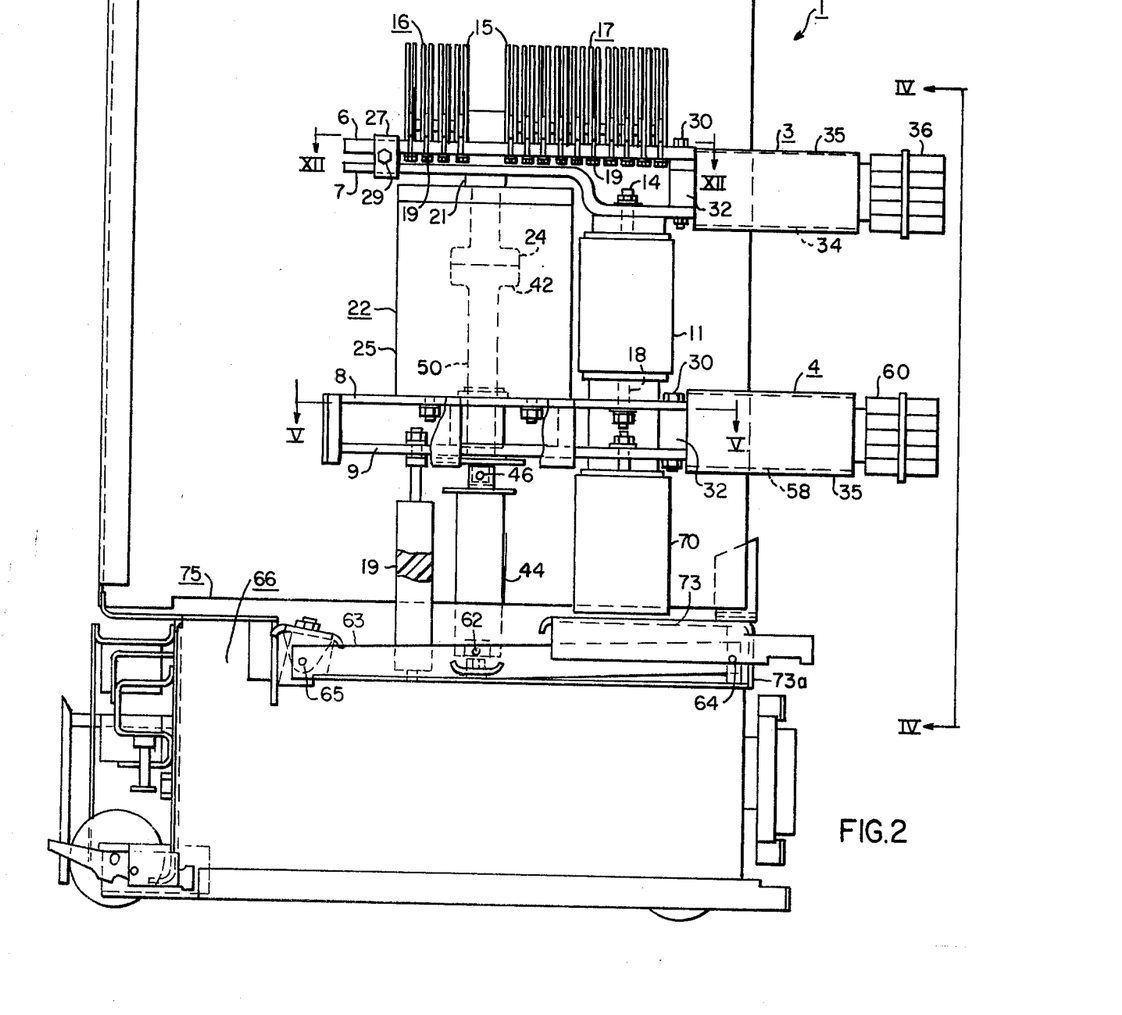
FIG. 2 is a side-elevational view of the threephase circuit-breaker of FIG. 1, again the contact structure being illustrated in the closed-circuit position with the primary disconnecting contact finger clusters being shown.

Referring to the drawings, and more particularly to FIGS. 1 and 2 thereof, the reference numeral 1 generally designates a roll-in-type switchgear unit. As well known by those skilled in the art, such roll-in-type switchgear units 1 are associated with cooperating cell-structure 2, partly shown in FIGS. 8 and 9, but reference may be had, additionally, if desired to FIGS. 35 and 37 of U.S. Pat. No. 3,590,188, and a description thereof is incorporated herein by reference.

Figure 6:
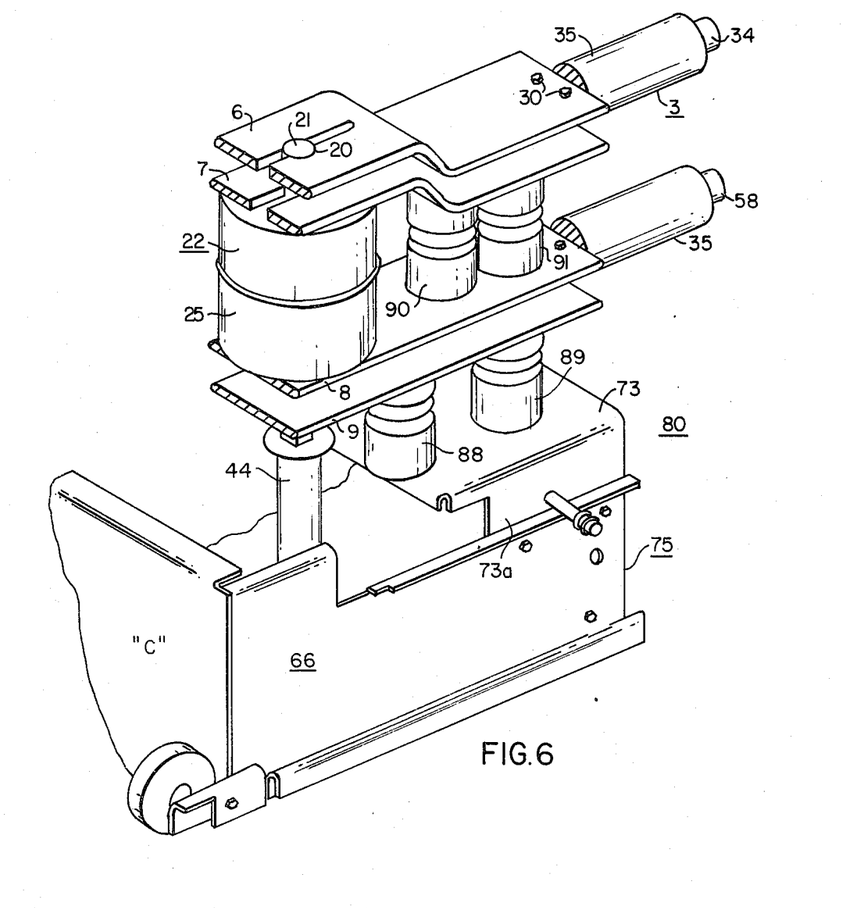
FIG. 6 is a fragmentary perspective view of a modification of the invention.
Figure 7:
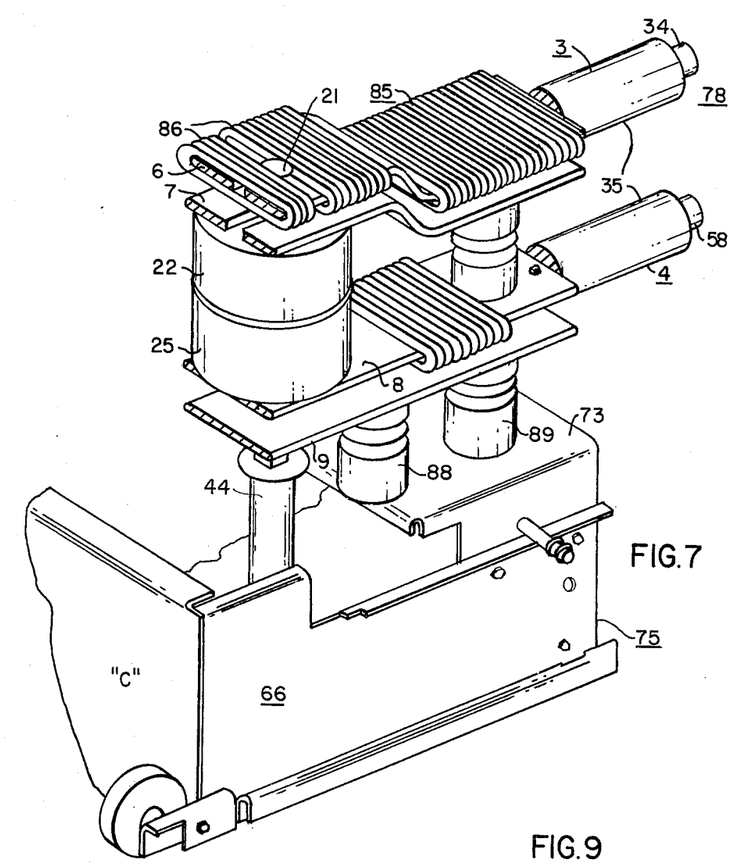
FIG. 7 is another perspective view of still a further modified form of the invention incorporating cooling fins about the power conductors for increased cooling effects.

In more detail, it will be observed that there is provided an upper power conductor assembly, generally designated by the reference numeral 3, and a lower power conductor assembly, generaly designated by the reference numeral 4, both of said power-conductor assemblies utilizing generally flat, horizontally disposed, stationary rectangularly-shaped bus-bar elements 6–9, as shown more clearly in FIGS. 2, 6 and 7 of the drawings.

Figure 4:
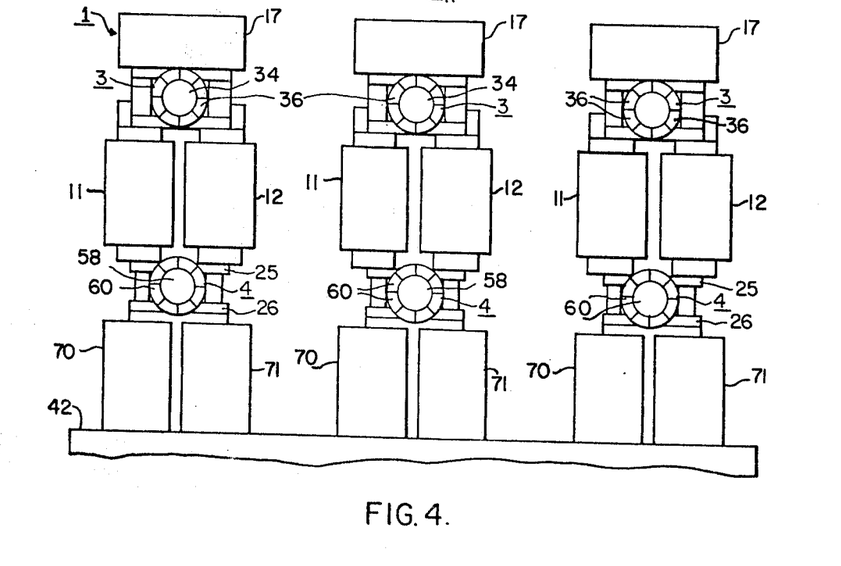
FIG. 4 is a rear fragmentary elevational view taken along the line IV—IV of FIG. 2 looking in the direction of the arrows.

With particular reference being directed to FIGS. 2 and 4 of the drawings, it will be observed that a pair of spaced post-type supporting insulators 11, 12 are arranged in side-by-side manner, and, additionally, transversely in a direction from the front to the rear of the circuit-breaker 1, as, for instance, in a direction looking directly into FIG. 1 of the drawings. Such a construction has the advantage that the bus-bar element 7 may itself be directly secured to both mounting studs 14 (FIG. 2) cemented into the upper ends of each of the vertically arranged post-type supporting insulators 11, 12. Also, it will be observed that the lower ends of the post-type insulators 11, 12 are fixedly secured, by their studs 18, to the lower rectangularly shaped bus-bar power-conductor element 8, as shown more clearly in FIG. 2.

Figure 12:
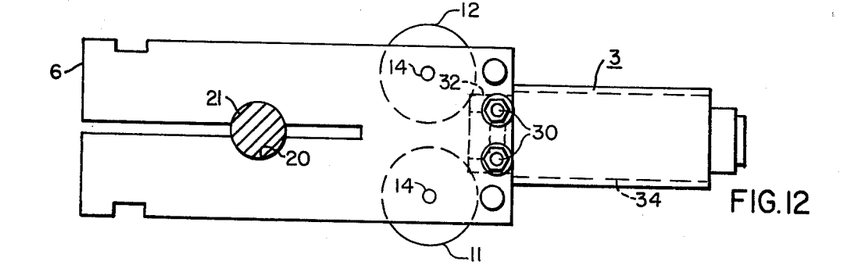

The upper spaced power-conductors 6, 7 are split and have apertures 20 (FIG. 12) provided therethrough, which may be accordingly clamped to the projecting stationary contact rod 21 extending externally of the vacuum-type interrupter-unit 22. This interrupter-unit 22 may optionally be of the vacuum type as is well known in the art, and may be, for example, of the type set forth in U.S. Pat. application filed July 24, 1972, Ser. No. 274,699, by Sidney J. Cherry, and assigned to the assignee of the instant patent application.

Generally, it will be noted, as mentioned, that there is provided an upper stationary contact 24 within the vacuum-interrupting unit having an upper projecting rodshaped stem portion 21, which extends upwardly externally of the vacuum envelope 25, and is clamped to the split rectangularly-shaped bus-bar power elements 6, 7 by U-shaped spaced clamping elements 27 (FIG. 2), bolted together by a clamping bolt 29. Note U.S. Pat. No. 3,749,861-Norman Davis in this connection. U.S. Pat. No. 3,603,753-Frink, issued Sept. 7, 1971, may also be of interest in this connection.

Figure 8:
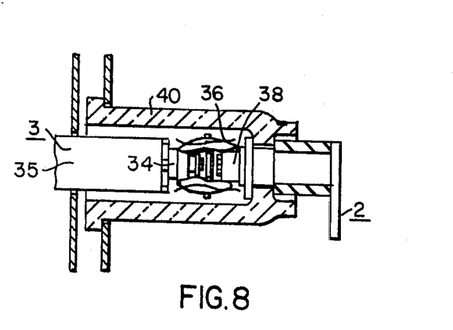
FIGS. 8 and 9 are fragmentary views of the cooperating cell structure and the cooperating engagement of the primary disconnecting contacts.
Figure 9:
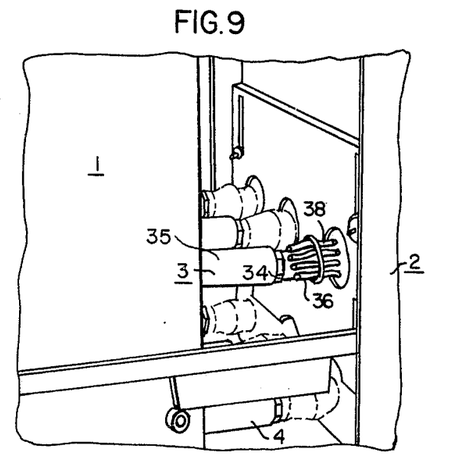
Figure 10:
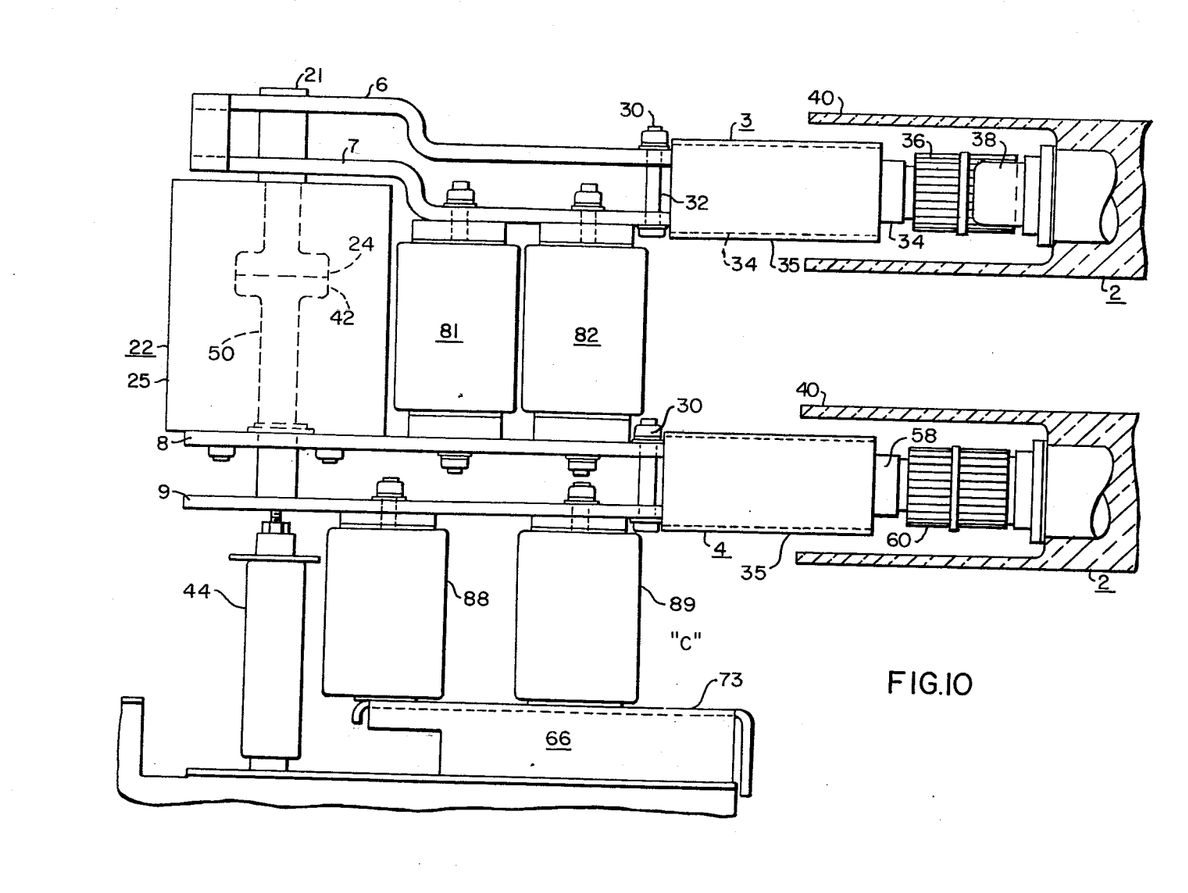
FIG. 10 is still another view, corresponding to FIG. 2, but showing the supporting post-type insulators front-to-back rather than side-to-side.

It will be apparent, therefore, that the upper stationary contact stud 21 is firmly mechanically clamped, as well as making good current-conducting relationship, between the stationary contact 24 within the vacuum unit 22 and the two conducting rectangularly shaped generaly horizontally arranged bus-bar plate-elements 6, 7. These bus-bar power elements 6, 7 are secured by mounting bolts 30 to a horizontally projecting boss-portion 32 provided at the inner end of a round insulated power-conductor stud 34, which may, for example, be of relatively short length, as shown more clearly in FIG. 2. Movable primary disconnecting finger-cluster contacts 36 connect the breaker conductor 34 to the cooperating cell contacts 38 (FIGS. 8 and 9). A transition between the rectangular bus-bar elements, 6, 7 and the round conductor bar 34 is made because the rectangular bars 6, 7 become too wide at the high currents to physically fit into the round porcelain "bottle" or insulating bushing 40 (FIGS. 8 and 10).

Figure 3:
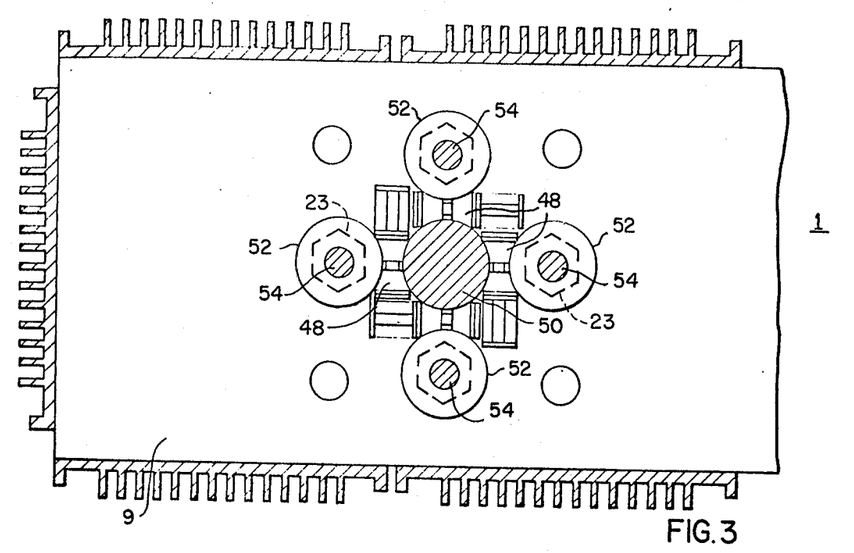
FIG. 3 is an enlarged detailed plan view, in section, taken substantially along the line III—III of FIG. 1.
Figure 5:
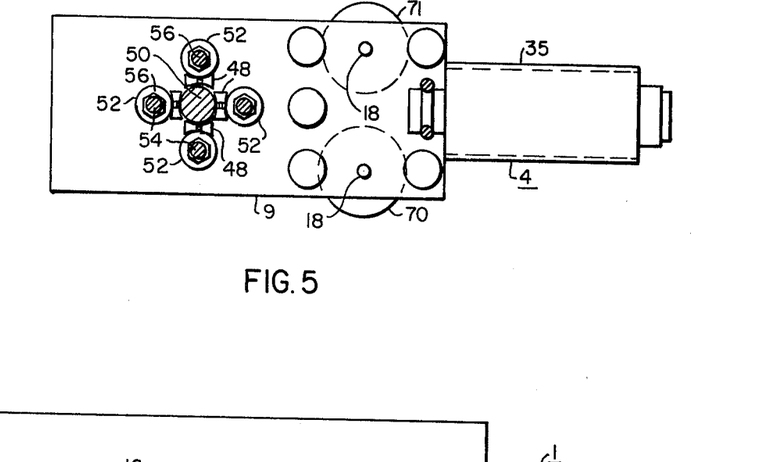
FIG. 5 is a sectional view taken along the line V—V of FIG. 2.

Cooperating with the relatively stationary contact 24 within the vacuum-interrupting unit 22 is a lower movable arcing contact 42, which is vertically movable by means of a lower insulating operating rod 44. As shown in FIG. 2, the upper end of the insulating operating rod 44 is connected by a pin connection 46, to the lower end of the projecting movable contact-stem 50, which engages a plurality of metallic contact-transfer rollers 48, more clearly illustrated in FIGS. 3 and 11 of the drawings. As illustrated in FIG. 3, the movable contact-rod, or stem 50 transmits line current, by way of the metallic rollers 48, to the four conducting spacing sleeves 52, which additionally may serve as suitable spacing means for spacing the lower conductor bars 8, 9 apart. In more detail, a plurality of mounting bolts 54 may pass centrally through the conducting spacing sleeves 52, and together with nuts 56 (FIG. 5) rigidly secure the spacing sleeves 52 between the confronting faces of the lower power conductor bars 8, 9. Thus, line power current is effectively transferred from the movable contact 42 and its lower projecting contact stem 50, through the metallic rollers 48, to the power conductor bars 8, 9, and then through the round solid conductor-stud 58, to the lower primary disconnecting contact fingers 60.

The lower end of the operating rod 44 is pivotally connected, as at 62, to a lower operating lever 63, which is stationarily pivoted at 64, and has its left-hand end pivotally connected, as at 65, to a suitable operating mechanism 66, constituting no part of the present invention. Reference may be had to U.S. Pat. No. 3,183,332-Frink et al for a description of a suitable operating mechanism 66, which may be employed to collectively operate the three pole-units A, B, C of the improved interrupting assembly 1 of the present invention.

As shown more clearly in FIGS. 2 and 4, an additional pair of laterally spaced post-type supporting insulators 70, 71 are bolted between the lower power-conductor bus-bar element 9 and a lower metallic grounded baseplate 73, which has its edges 73a curved over to form mounting-flange portions of the lower main supporting frame 75. FIG. 2 shows the insulator pair 11, 12 and 70,71 disposed side-to-side rather than from front-to-back. This insulator arrangement is better for higher momentary currents where the side-to-side forces get high at the higher currents. However, a tie-rod 19 is then required for front-to-back stability. Furthermore, a combination of the properties of side-to-side insulators and front-to-back insulators can be achieved by placing them diagonally, as viewed in FIG. 11, and thereby giving substantial stability front-to-back and side-to-side.

FIG. 6 illustrates a perspective view of a modified form of the invention, designated by the reference numeral 80, wherein it will be more readily be seen the clamping relationship of the split bus-bar elements 6, 7 to the projecting contact rod 21 of the vacuum-interrupter unit 22, with the utilization of low-cost component parts for the pole-unit C. Also, it will be observed that with the generally horizontal rectangular power-conductor construction 6, 7, utilizing aluminum, for example, instead of copper, ready accommodation of optionally provided cooling-fin structures 85, such as are more clearly illustrated in the perspective view of FIG. 7 may be accomplished. With reference to FIG. 7 in particular, it will be observed that a multiplicity of washer-shaped cooling fins 86 may be placed over the power-conductor elements 6, 8, as shown, to provide additional heat-dissipation capacity of the power-conductor assemblies to the atmosphere. Thus, the power-conductors 6–9 and the finned cooling washers 86 may be of aluminum with, for example, the round power-conductors 34, 58 being fabricated of copper, if desired, because of the restrictive physical confines of the porcelain "bottle" or bushings 40 and having insulating sleeves 35 disposed thereabout.

From the foregoing description of the invention it will be observed that by providing generally horizontal rectangularly shaped bus-bar power elements 6–9, instead of round power-conductors, a ready attachment to the posttype supporting insulators 11, 12 is achieved with facilitated cooling to the atmosphere, because of the vertical spacing between the separated bus-bar elements 6–9. However, where desired, for the higher-current ratings, the large flat conductors provide ample surface for heat to be dissipated by cooling-fin structures 85, as illustrated, for example, in FIG. 7. In prior-art constructions, the conductors have not been exposed to provide surfaces for attaching cooling fins. More surface area provided by the cooling fins results in higher possible current ratings of the circuit-breaker.

From the foregoing it will be apparent that the present invention is concerned with a novel arrangement of power conductors, supporting porcelain and interrupter units 22 that allows higher continuous currents to be obtained than the old-type prior-art circuit-breaker structures. Besides being an improvement in current ratings, it is also a much lower-cost concept than prior-art constructions. The development of new, high-strength, post insulators 11, 12, 70 and 71 for the circuit-breaker 1 has made the present design possible with assurance of rigidity and stability.

A saving of $200 per breaker over prior-art constructions was obtained by using a lower-cost form of supporting porcelain, and by using rectangular power conductors 6–9, which provide mechanical mountings at no extra cost. Also, such a reduction was achieved by using aluminum instead of copper. In addition, smaller power conductors 6–9 can be used because the present invention leaves the spaced power conductors 6–9 in open air to be cooled more effectively by convection and radiation. Because this construction offers up to 3,000-ampere rating without needing forced-air cooling of the power conductors, a savings in the cell structure 2 must additionally be added to the $200 figure. For a 1,200-ampere circuit-breaker rating, the flat power-conductors 6–9 would be, of course, smaller, and could therefore continue back inside the procelain enclosures, or "bottles" 40 within the cooperating cell-structure 2 because of their smaller physical size. It will be noted that in the present construction only a few inches of round copper conductor 34, 58 would be used for the transition from aluminum bar to the copper bar.

FIG. 6 shows the same conductor and mounting features but with the insulator pair 90, 91 disposed front-to-back rather than laterally or side-to-side. Furthermore, a combination of the properties of side-to-side supporting insulators and front-to-back supporting insulators can be achieved by placing the post insulators diagonally, as viewed in FIG. 11, and thereby given substantial stability front-to-back and also side-to-side.

Figure 11:
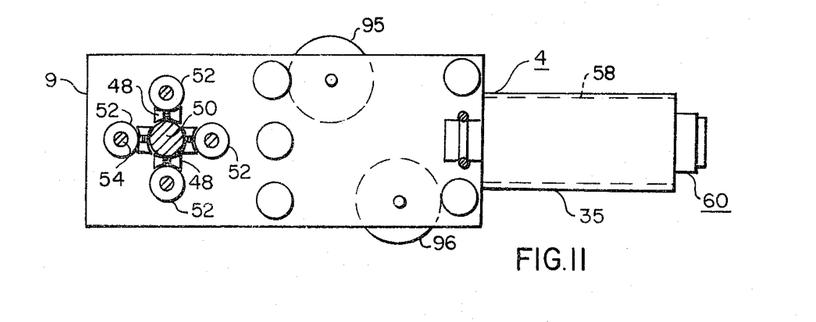
FIG. 11 is a detailed plan view, in section, of diagonal-mounted insulators; and, FIG. 12 is a sectional view taken along the line XII—XII of FIG. 2.

In FIG. 11, the post supporting insulators 95, 96 are disposed diagonally, as shown.

A plurality of cooling fins 15 (FIG. 1) may be bolted, or otherwise fixedly secured, to the upper conductor-support plate 6 to assist in the cooling action, so as to enable the circuit-interrupter 1 to be capable of passing heavyamperage currents without requiring a large cross-sectional area of the conductor-support plates 6, 7, 8 and 9. Consequently, the circuit-interrupter 1 of the present invention is able to operate at higher continuous currents without modification to the cell-structure 2. By virtue of the relative positions of the insulators 11, 12, conductors 3, 4 and the interrupting unit 22, the disclosed arrangement has rigidity comparable to the solid insulation pole-units, such as set forth in U.S. patent application filed Oct. 18, 1972, Ser. No. 298,689, by Charles M. Cleaveland, and assigned to the assignee of the instant patent application.

The rigidity afforded by this unique arrangement allows the circuit-interrupter 1 to withstand the large phase-to-phase forces, which accompany high momentary currents The upper cooling fin-assemblies 16 and 17 are more particularly set forth in FIG. 2 of the drawings. They are secured, as by a plurality of mounting bolts 19, to the upper conductor-bar 6 of the circuit-interrupting assembly 1.

Some of the advantages of the particular insulator-supporting arrangement, as set forth in the instant patent application, are as follows:

1. The horizontal flat conductors 7, 8 offer a flat mounting surface for supporting the post-type insulators 11, 12.

2. The same horizontal flat conductor-bar 8 offers a flat mounting surface for the vacuum-interrupter 22. Also, the combining of current-carrying conductors 7, 8 and the mechanical mounting arrangement results in low-cost improvement.

3. As the current ratings increase from 2,000 amperes to 3,000 amperes, the width of the flat conductors 6–9 becomes too great to physically fit inside the porcelain cell-bottles 40. Therefore, the flat conductors 6–9 are terminated and the round conductors 34, 58 are disposed interiorly of the porcelain bottle 40.

The insulators 81, 82 (FIG. 10) are disposed in front-to-back arrangement, and thereby provide stability and parallelness of the flat conductors 7, 8, and maintain the spacing between the upper and lower conductors 7 and 8 so that the finger cluster contacts 36, 60 will be properly aligned for connecting to the cell-conductors 38.

The separated flat conductors 6-9 are of the "open" construction so as to be cooled by air convection flow. In the past, the breaker power conductors were surrounded by supporting porcelain.

The separated conductor-bars 6–9 provide space for cooling fins, as set forth in U.S. Pat. No. 3,621,108, "Heat Conducting Fins For Bus-bar And Other Electrical Conductors."

The flat bar is less expensive than the round bar and the post-insulators are less expensive than the monolithic porcelain supports common to porcelain breakers of the past, as exemplified in U.S. Pat. No. 3,437,554- James Gamble.

In the construction set forth in FIGS. 6 and 7, it will be noted that since the stand-off insulators 90, 91 are disposed in front of each other, that is, in general alignment with the direction of the conductor-bar assemblies 3, 4, that the upper and lower horizontally-arranged bus-bar plate, 7, 8 both being secured to the front-to-back stand-off insulators 90, 91, necessarily insures a parallel mounting arrangement of the moving primary disconnecting contacts 36, 60; consequently, no further adjustment is generally required.

It is moreover to be realized that to minimize the axial length of the round terminal studs, 34, 58, the horizontal flat bus-bar plates 6–9 may be extended to a greater extent rearwardly, if desired.

The lateral width of the lower bus-bar plate 8 and the lateral width of the upper bus-bar plate 7 is sufficient to accomodate both lateral standoff insulators 11, 12 for adequate mounting surface, if desired.

Because there are parallel double conductors 6–9 on the upper and lower conductor assemblies 3, 4, I am thereby able to get enough material cross-section, within the space alone, to give the circuit-breaker 1 a threethousand ampere rating, which is a new and increased circuit-breaker rating. Also, the conductors 6–9 can be either copper or aluminum, being the same physical size, to give two current ratings with the same physical interruption construction. Because the vacuum-"bottle" or interrupting unit 22 is, in some ratings, eight inches in diameter, the conductor-bar 8 can extend laterally to the full width of the vacuum bottle 22 to provide the necessary cross-sectional area for current-rating capability.

It will be noted that a particular advantage of the present construction is the extension of the flat conductors 6–9 beyond the insulators 34 to provide mounting surfaces for both the vacuum-interrupter unit 22, when used, and for the supporting insulators 11, 12, 90, 91. The extended conductors 6–9 serve as mounting surfaces also for fins 15, 86, where additional cooling action is desired. With the flat conductor-bars 6–9 supporting the stand-off insulaters 90, 91, one in front of the other, the conductor alignment is thereby stabilized, assuming that the insulators axial dimensions are closely controlled by manufacturing processes.

Also, the double-conductor arrangement 6, 7 and 8, 9 permits greater current-carrying capacity for example, providing a 3,000 ampere rating, within a very compact construction, which is adapted to be used with the horizontallyoriented flat conductor features previously mentioned.

Although there have been illustrated and described specific structures, it is to be clearly understood that the same were merely for the purpose of illustration, and that changes and modifications may readily be made therein, by those skilled in the art, without departing from the spirit and scope of the invention.

I claim:

1. A draw-out-type of circuit-breaker comprising a movable truck having a lower-disposed supporting means, a vacuum-type circuit-interrupting unit, separable contact means provided interiorly within said vacuum-type circuit-interrupting unit, a pair of post-type, side-by-side post-insulator supports extending generally parallel to one another, and extending in the same general direction, said pair of side-by-side post-insulator supports additionally being closely spaced next to each other and mechanically rigidly interconnected at at least one end thereof for combined strength and rigidity of support, said pair of post-type insulator supports being generally parallel with the vacuum-type circuit-interrupting unit, means defining an upper stationary power-conductor assembly comprising a pair of stationary vertically closely spaced rectangularly-shaped horizontally arranged flat power bus-bar elements extending generally in the direction of truck movement, means for fixedly securing the lower stationary power busbar element of said upper stationary power-conductor assembly to the upper ends of said pair of closely spaced post-type insulator supports, a stationary contact and a stationary contact-stem extending upwardly externally of the vacuum-type circuit-interrupting unit, means for clamping the spaced stationary power bus-bar elements to said externally protruding stationary contact-stem, an additional stationary lower-disposed power-conductor assembly comprising a pair of closely vertically spaced stationary rectangularly shaped generaly-horizontally extending flat power bus-bar elements, the upper stationary power bus-bar element of said lower-disposed stationary power-conductor assembly being fixedly clamped to the lower ends of the closely spaced two post-type insulator supports, attachment means for also attaching said upper stationary power bus-bar element of the lower stationary power-conductor assembly to the lower end of said vacuum-type circuit-interrupting unit for fixedly supporting the same, and said lower-disposed supporting means of said movable truck supporting said additional lower-disposed stationary power-conductor assembly.

2. The combination according to claim 1, wherein the pair of post-type insulators are arranged in front-to-rear relationship in the general direction of truck movement.

3. The combination according to claim 1, wherein the upper stationary power-conductor-element of the lower-disposed power-conductor assembly (4) is attached to the lower end of the vacuum-type circuit-interrupting unit for fixedly supporting the same.

4. The combination according to claim 1, wherein a round power-conductor element of relatively short length extends in the direction of truck movement, and is fixedly secured to the rear end of the upper-disposed power-bus-bar elements, and movable primary disconnecting contact fingers are secured to the rear external end of the round power-conductor element for mating engagement with the cell primary disconnecting contacts.

5. The combination according to claim 4, wherein a second round power-conductor element extending in the direction of truck movement is secured to the lower-spaced stationary power-bus-bar elements of the lower stationary power-conductor assembly, and a lower set of movable primary disconnecting contact fingers is secured to the lower-disposed round power-conductor at the rear external end thereof.

6. A draw-out-type of circuit-breaker comprising a movable truck having a lower-disposed supporting means, means defining a circuit-interrupting unit, separable contact means associated with said circuit-interrupting unit, a pair of post-type side-by-side post-insulator supports extending generally parallel to one another and extending in the same general direction, said pair of side-by-side post-insulator supports, additionally, being closely spaced next to each other and mechanically rigidly interconnected at at least one end thereof for combined strength and rigidity of support, means defining an upper stationary power-conductor assembly comprising a pair of stationary vertically closely spaced rectangularly shaped horizontally arranged flat power-bus-bar elements extending generally in the direction of truck movement, means for fixedly securing the lower stationary power-bus-bar element of said upper stationary power-conductor assembly to the upper ends of said pair of said closely spaced post-type insulator supports, an additional stationary lower-disposed power-conductor assembly comprising a pair of closely vertically spaced stationary rectangularly shaped generally-horizontally extending flat power-bus-bar elements, the upper stationary power bus-bar element of said lower-disposed stationary power-conductor assembly being fixedly clamped to the lower ends of the closely spaced two post-type insulator supports, attachment means for also attaching said upper stationary power bus-bar element of the lower stationary power-conductor assembly to the lower end of said circuit-interrupting unit for fixedly supporting the same, and said lower-disposed supporting means of said movable truck supporting said additional lower-disposed stationary power-conductor assembly.

7. The combination according to claim 6, wherein an additional pair of closely-spaced post-type insulator supports at least partially comprise the lowerdisposed supporting means of said moable truck, and mechanically interconnect the truck-frame to the lowerdisposed power-conductor assembly.

8. The combination according to claim 1, wherein an additional set of lower-disposed closely spaced, side-by-side post-insulator supports is secured to the lower-disposed stationary power conductor assembly having their lower ends supported by said movable truck.

9. The combination according to claim 1, wherein a lower main frame on said movable truck is provided having a supporting plate portion, and a second pair of closely-spaced vertically-extending post-type insulator supports are clamped between the lower-disposed power conductor assembly and said supporting plate portion of the movable truck. --.

* * * * *